(12) United States Patent
McDysan et al.

(10) Patent No.: US 8,856,813 B2
(45) Date of Patent: Oct. 7, 2014

(54) ADAPTIVE VIDEO QUALITY SUBSTITUTION

(75) Inventors: David E. McDysan, Great Falls, VA (US); Daniel J. O'Callaghan, Fairfax Station, VA (US); Stevan H. Leiden, Norwood, MA (US); Douglas M. Pasko, Bridgewater, NJ (US); John E. Rathke, Southborough, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 12/953,260

(22) Filed: Nov. 23, 2010

(65) Prior Publication Data

US 2012/0131601 A1 May 24, 2012

(51) Int. Cl.
*H04N 7/16* (2011.01)
*H04N 21/238* (2011.01)
*H04N 21/24* (2011.01)
*H04N 21/254* (2011.01)
*H04N 21/258* (2011.01)

(52) U.S. Cl.
CPC ..... *H04N 21/2541* (2013.01); *H04N 21/23805* (2013.01); *H04N 21/2402* (2013.01); *H04N 21/25808* (2013.01)
USPC ........ 725/1; 725/31; 725/32; 725/34; 725/64; 725/91; 725/104

(58) Field of Classification Search
USPC ......................... 725/1, 31, 32, 34, 64, 91, 104
See application file for complete search history.

(56) References Cited

U.S. PATENT DOCUMENTS

| 2003/0028889 | A1* | 2/2003 | McCoskey et al. ............. 725/91 |
| 2004/0013194 | A1* | 1/2004 | Piche et al. ................. 375/240.2 |
| 2010/0027966 | A1 | 2/2010 | Harrang et al. |
| 2010/0031299 | A1 | 2/2010 | Harrang et al. |
| 2010/0070628 | A1 | 3/2010 | Harrang et al. |
| 2010/0121941 | A1 | 5/2010 | Harrang et al. |
| 2010/0131385 | A1 | 5/2010 | Harrang et al. |
| 2010/0269146 | A1* | 10/2010 | Britt ............................. 725/110 |

\* cited by examiner

*Primary Examiner* — Jivka Rabovianski

(57) ABSTRACT

A computing device, in a video content delivery network, intercepts requested video content prior to delivery of the requested video content to a customer premise device of the network, and receives subscription and authentication information of a customer associated with the customer premise device. The computing device receives video content provider information, and validates the requested video content based on the subscription and authentication information and the video content provider information. The computing device receives capability information associated with the customer premise device, and receives bandwidth information associated with the network. The computing device determines a quality of video content, to provide to the customer premise device, based on the customer premise device capability information and the network bandwidth information, and provides, to the customer premise device, video content with the determined quality.

25 Claims, 8 Drawing Sheets

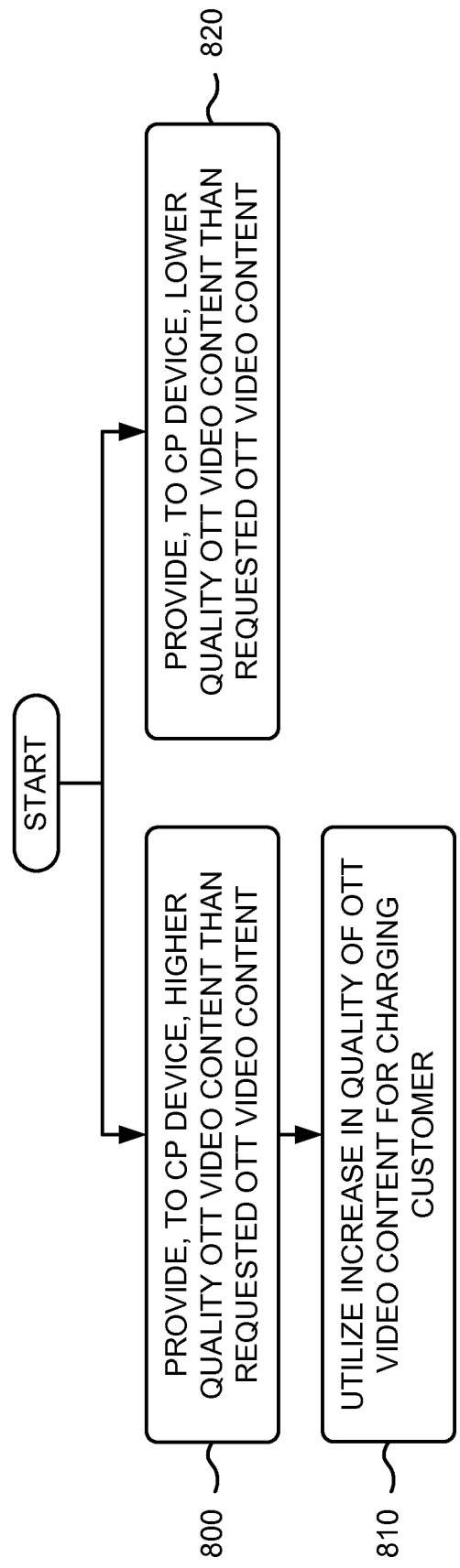

ADAPTIVE VIDEO QUALITY SUBSTITUTION

BACKGROUND

Video content (e.g., television shows, pay-per-view (PPV) content, video-on-demand (VOD) content, etc.) may be delivered and selected in several ways. For example, television channels may be broadcast to subscribers' homes and a channel may be viewed via subscriber selection from a channel lineup. Time shifted Internet protocol (IP) television (IPTV) emulates this broadcast delivery over IP, which overcomes bottlenecks associated with lower speed access networks (e.g., twisted pair, digital subscriber line (DSL), wireless, etc. networks) by sending content during time periods when there is spare capacity, or sending content at a rate slower than the playback rate as constrained by an access network bandwidth.

However, IPTV provides a large number of channels that make user selection difficult. Digital video recorders (DVRs) may be used to record video content so that the video content may be viewed at a later time. DVR-based recording, however, is largely limited to tuning to a particular channel (e.g., from a channel lineup), and selecting a time period for recording the particular channel.

Over the top (OTT), or IP unicast, delivery of video content may provide video content to any connected device (e.g., televisions, computers, gaming consoles, smart phones, etc.). OTT video content may include, for example, pre-recorded video content (e.g., television episodes), and content associated with video portals provided by content providers, such as Hulu™, YouTube™, CNN, etc. OTT delivery provides near real time transmission (e.g., with an adaptive transmission rate) of video content, with limited buffering. Furthermore, video content requests are directed to content servers in order to optimize criteria or meet constraints associated with the video content requests. The content servers may optimize the requests' criteria or meet constraints based on performance (e.g., latency), minimum topology hops, historical server load (e.g., sessions, throughput, etc.), economic cost, etc. Content delivery networks (CDNs) may use a variety of mechanisms to determine optimality and/or constraints associated with video content requests. For example, CDNs may configure and transfer address assignments into CDN trackers; may configure domain name system (DNS) redirection; may use load balancers to distribute traffic between servers in a site or between sites; may use quasi-static application layer traffic optimization and pay for performance (P4P) approaches to provide feedback; and may use heuristic algorithms.

However, OTT delivery of video content over a routed network can make use of only limited topology and load information and must convey the content at the playback rate in near real time and only at the requested rate and quality. Furthermore, OTT delivery requires manual (or operations support systems (OSS) application-based) configuration of consistent information in multiple servers. Thus, true optimization is difficult to achieve in OTT delivery of video content and OTT delivery may create network congestion and/or additional operator expense to provision the network for peak load.

BRIEF DESCRIPTION OF THE DRAWINGS

FIGS. 6-8 are flow charts of an example process for providing adaptive video quality substitution according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide adaptive video quality substitution for video content. The adaptive video quality substitution may match a quality of the delivered video content to the capabilities of a device receiving the video content and/or based on network bandwidth available for delivering the video content. In one example, the systems and/or methods may apply adaptive video quality substitution to OTT video content. In other examples, the systems and/or methods may apply adaptive video quality substitution to video content other than OTT video content.

In one example implementation, the systems and/or methods may be implemented in a network that delivers video content. The systems and/or methods may intercept OTT video content (or a request for OTT video content) prior to delivery of the OTT video content to a customer premise device of the network, and may determine copyright information associated with the requested OTT video content. The systems and/or methods may receive subscription and/or authentication information of a customer associated with the customer premise device, and may receive OTT video content provider information. The systems and/or methods may validate the requested OTT video content based on the copyright information, the subscription/authentication information, and/or the OTT video content provider information, and may receive customer premise device capability information and/or network bandwidth information. The systems and/or methods may determine a quality of OTT video content to provide based on the customer premise device capability information and/or the network bandwidth information, and may provide the OTT video content, with the determined quality, to the customer premise device.

As used herein, the terms "subscriber," "customer,' and/or "user" may be used interchangeably. Also, the terms "subscriber," "customer," and/or "user" are intended to be broadly interpreted to include a user device (e.g., a mobile telephone, a personal computer, a set-top box, a television, etc.) or a user of a user device.

Figure 1:
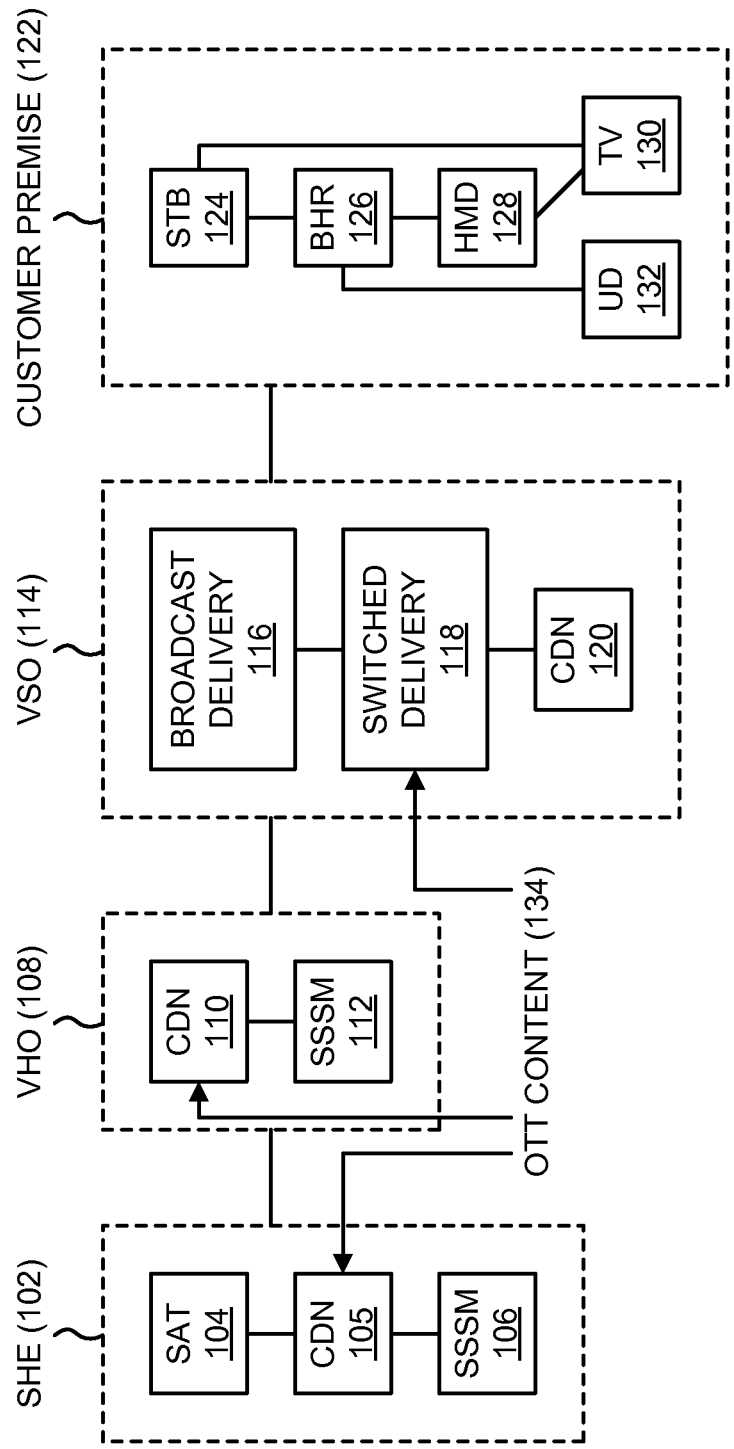
FIG. 1 is a diagram of an example network in which systems and/or methods described herein may be implemented.

FIG. 1 is a diagram of an example network 100 in which systems and/or methods described herein may be implemented. As illustrated, network 100 may include a super head end (SHE) 102 that includes a satellite dish (SAT) 104, content delivery network (CDN) storage 105, and a subscription/selection/search management (SSSM) server 106; a video hub office (VHO) 108 that includes CDN storage 110 and a SSSM server 112; a video serving office (VSO) 114 that includes a broadcast delivery system 116, a switched delivery system 118, and CDN storage 120; a customer premise 122 that includes a STB 124, a broadband home router (BHR) 126, a home media device (HMD) 128, a television (TV) 130, and a user device (UD) 132.

Components of network 100 may interconnect via wired and/or wireless connections. The lines shown between components of network 100 represent example connections. However, components of network 100 may connect to one or more other components of network 100 even if a line showing a connection is not depicted in FIG. 1. Single components and/or networks have been illustrated in FIG. 1 for simplicity. In practice, there may be more components and/or networks than depicted in FIG. 1.

SHE 102 may include one or more server devices (e.g., a top level of CDN or cache hierarchy), or other types of computation or communication devices, that gather, process, search, and/or provide information in a manner described herein. In one implementation, SHE 102 may include a computer system, applications, a cable head-end, and/or broadcasting devices capable of providing video content (e.g., VOD content, high definition (HD)-VOD content, TV programming, movies, on-demand services, live television, IPTV, etc.), commercials, advertisements, instructions, voice content (e.g., voice over IP (VoIP)), and/or other information to customer premises equipment (CPE). In one example, SHE 102 may include a television media reception, processing, and distribution system that selects, combines, and transmits the video content (e.g., VOD, IPTV, etc.) to other headend distribution systems.

Satellite dish 104 may include a parabolic antenna (or other types of antennas) designed to receive microwaves from communications satellites, which transmit data transmissions or broadcasts, such as satellite television, VOD content, etc.

CDN storage 105 may include a random access memory (RAM) or another type of dynamic storage device that stores information and instructions, a read only memory (ROM) or another type of static storage device that stores static information and instructions, and/or some other type of magnetic or optical recording medium and its corresponding drive for storing information and/or instructions. In one example implementation, CDN storage 105 may receive non-real time video content (e.g., OTT video content, pre-recorded video content, previous episodes, media-oriented advertisements, etc.), and may provide the non-real time video content to CDN storage 110.

SSSM server 106 may include one or more server devices, or other types of computation or communication devices, that gather, process, search, and/or provide information in a manner described herein. In one implementation, SSSM server 106 may include one or more server devices that enable the scheduling and coordinating of under-the-bottom time-shifted distribution of non-real time video content (e.g., OTT video content, pre-recorded video content, previous episodes, media-oriented advertisements, etc.) during idle time periods of network 100 (e.g., at night, during low traffic, etc.). In one example, SSSM server 106 may instruct CDN storage 105 to provide such non-real time video content to CDN storage 110, and SSSM server 112 may instruct CDN storage 110 to forward the non-real time video content to switched delivery system 118, CDN storage 120, and/or HMD 128. The non-real time video content may be provided "under-the-bottom" of network 100 since the content is provided when network 100 is not experiencing congestion. In contrast, and as described above, OTT delivery of video content may create network congestion.

VHO 108 may include one or more server devices, or other types of computation or communication devices, that gather, process, search, and/or provide information in a manner described herein. In one implementation, VHO 108 may include a computer system, applications, and/or broadcasting devices capable of providing video content to a regional location. A regional VHO 108 may serve a local VSO (e.g., VSO 114), and the local VSO may provide the video content to customer premises equipment.

CDN storage 110 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 110 may receive VOD content from satellite dish 104, and may provide the VOD content to broadcast delivery system 116 and/or switched delivery system 118. In another example implementation, CDN storage 110 may receive non-real time video content from CDN storage 105, and may provide the non-real time video content to switched delivery system 118, CDN storage 120, and/or HMD 128.

SSSM server 112 may include one or more server devices, or other types of computation or communication devices, that gather, process, search, and/or provide information in a manner described herein. In one implementation, SSSM server 112 may include one or more server devices that provide under-the-bottom time-shifted distribution of non-real time video content during idle time periods of network 100. In one example, SSSM server 112 may instruct CDN storage 110 to provide such non-real time video content to switched delivery system 118, CDN storage 120, and/or HMD 128. The non-real time video content may be provided "under-the-bottom" of network 100 since the content is provided when network 100 is not experiencing congestion.

VSO 114 may include one or more server devices, or other types of computation or communication devices, that gather, process, search, and/or provide information in a manner described herein. In one implementation, VSO 114 may include a computer system, applications, and/or broadcasting devices capable of receiving video content from a regional VHO (e.g., VHO 108), and providing the video content to customer premises equipment (e.g., to STB 124, BHR 126, etc.).

Broadcast delivery system 116 may include one or more server devices, or other types of computation or communication devices, that gather, process, search, and/or provide information in a manner described herein. In one implementation, broadcast delivery system 116 may include a computer system, applications, and/or broadcasting devices capable of receiving broadcast television content from satellite dish 104, and providing the broadcast television content to STB 124. Broadcast delivery system 116 may also provide IPTV content (e.g., received from satellite dish 104) to switched delivery system 118, and switched delivery system 118 may provide the IPTV content to BHR 126.

Switched delivery system 118 may include one or more server devices, or other types of computation or communication devices, that gather, process, search, and/or provide information in a manner described herein. In one implementation, switched delivery system 118 may include a network of devices capable of receiving VOD content and non-real time video content from CDN storage 110, receiving IPTV content from broadcast delivery system 116, and receiving non-real time video content from CDN storage 120. Switched delivery system 118 may provide the VOD content, the IPTV content, and/or the non-real time video content to BHR 126. Switched delivery system 118 may provide unicast or multicast content. Multicast content may require scheduling by SSSM servers 106/112 to optimize delivery of content to a large number of HMDs 128 (e.g., selecting and subscribing to popular content). Any portions of content dropped during multicast transmission (e.g., due to bit errors or packet loss) can be resent via unicast transmission. Furthermore, if some HMDs 128 are off line (e.g., due to a power or network outage), such HMDs 128 may "caught up" via unicast transmission.

CDN storage 120 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 120 may store non-real time video content received from CDN storage 110, and may provide the non-real time video content to switched delivery system 118.

Customer premise 122 may include a subscriber's premises (e.g., a home) and the associated equipment connected with a service provider (e.g., a carrier's telecommunication equipment).

STB 124 may include a device that receives and/or processes video content, and provides the video content to television 130 or another device. STB 124 may also include decoding and/or decryption capabilities and may further include a digital video recorder (DVR) (e.g., a hard drive). In one example implementation, STB 124 may be incorporated directly within television 130. In another implementation, STB 124 and/or television 130 may be replaced with a computing device (e.g., a personal computer, a laptop computer, a tablet computer, etc.), a cable card, a TV tuner card, or a portable communication device (e.g., a mobile telephone or a PDA). In one example, STB 124 may receive video content (e.g., broadcast television content, IPTV content, VOD content, etc.) from broadcast delivery system 116 and/or BHR 126, and may provide the video content to television 130 for display.

BHR 126 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, BHR 126 may be physically deployed with a satellite antenna (e.g., on a roof or a side wall of a house associated with customer premise 122). BHR 126 may support sharing of cable modem or Internet connections, and may include various network security features like firewall capability. In one example, BHR 126 may receive video content (e.g., IPTV content or VOD content) from switched delivery system 118, and may provide the video content to STB 124. In another example, BHR 126 may receive real time and/or non-real time video content from switched delivery system 118 and/or HMD 128, and may provide the real time and/or non-real time video content to television 130 and/or to user device 132.

HMD 128 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, HMD 128 may provide storage for non-real time video content (e.g., received from CDN storage 110 during idle time periods or network 100), and may provide the non-real time video content to BHR 126 when user device 132 requests the non-real time video content.

Television 130 may include a television monitor that is capable of displaying video content, television programming, content provided by STB 124, and/or content provided by other devices (e.g., a digital video disk (DVD) player, a video camera, etc., not shown) connected to television 130.

User device 132 may include any device that is capable of communicating with BHR 126 (e.g., to reach other functions in network 100, such as SSSM servers 106/112) in order to, for example, request and/or receive video content. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a tablet computer, a television, a gaming system, etc.

As further shown in FIG. 1, OTT content 134 may be provided to CDN storage 105 (e.g., which may be controlled by SSSM server 106), CDN storage 110 (e.g., which may be controlled by SSSM server 112), and/or switched delivery system 118. OTT content 134 may include, for example, pre-recorded video content (e.g., television episodes); content associated with video portals provided by content providers, such as Hulu™, YouTube, CNN, etc.; video content delivered over an alternative means (e.g., the Internet) rather than a main video delivery infrastructure (e.g., a cable television infrastructure); etc.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
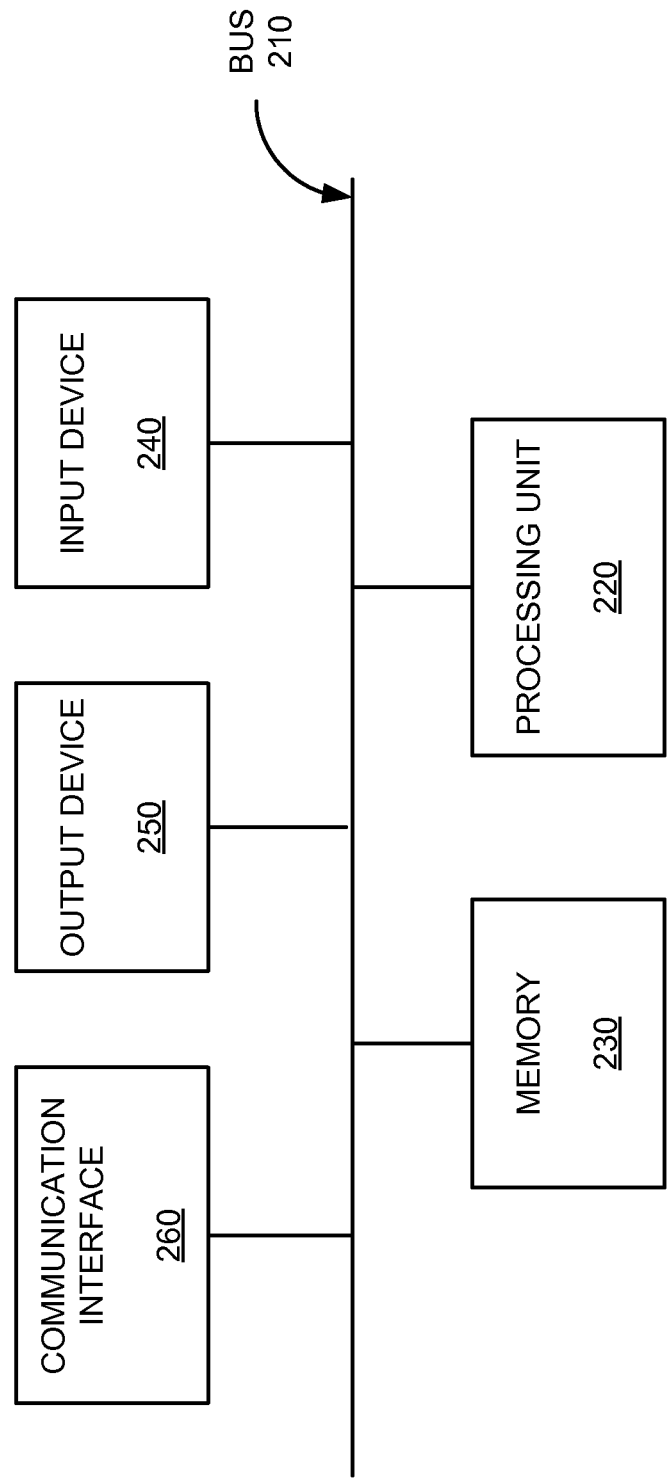
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
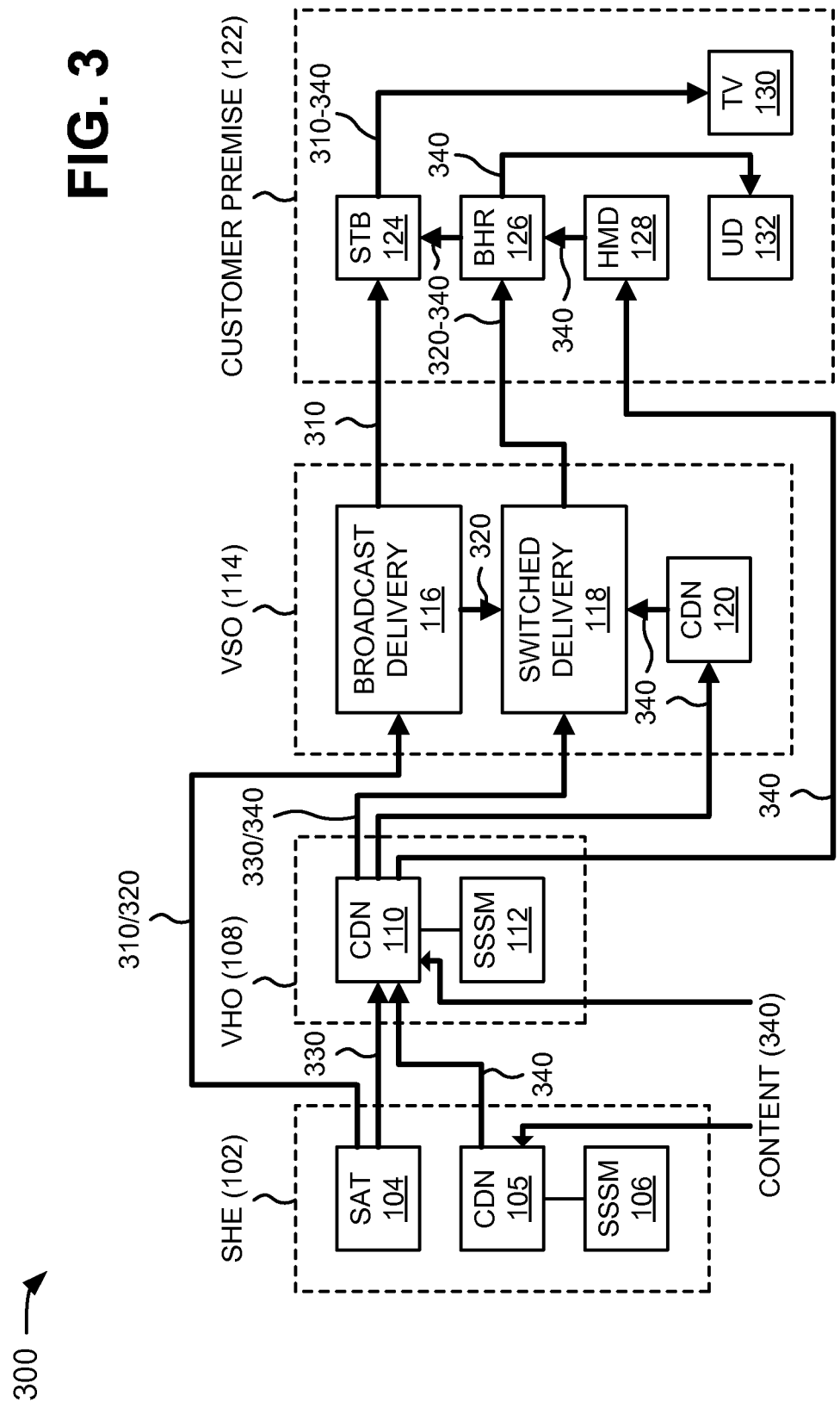
FIG. 3 is a diagram of example interactions between components of an example portion of the network depicted in FIG. 1.

FIG. 3 is a diagram of example interactions between components of an example portion 300 of network 100. As illustrated, example network portion 300 may include SHE 102, satellite dish 104, CDN storage 105, SSSM server 106, VHO 108, CDN storage 110, SSSM server 112, VSO 114, broadcast delivery system 116, switched delivery system 118, CDN storage 120, customer premise 122, STB 124, BHR 126, HMD 128, television (TV) 130, and user device (UD) 132. In one implementation, the components depicted in network portion 300 may include the features described above in connection with one or more of FIGS. 1 and 2.

As further shown in FIG. 3, satellite dish 104 may receive video content 310 (e.g., via reception of satellite transmissions), and may provide video content 310 to broadcast delivery system 116. In one example, video content 310 may include content adhering to quadrature amplitude modulation (QAM) broadcast standards, such as broadcast television. Broadcast delivery system 116 may provide video content 310 to STB 124, and STB 124 may provide video content 310 to television 130. Television 130 may receive video content 310 and may display video content 310 (e.g., to a user).

Satellite dish 104 may receive video content 320 (e.g., via reception of satellite transmissions), and may provide video content 320 to broadcast delivery system 116. In one example, video content 320 may include real time (RT) multicast video content, such as broadcast long-tail IPTV content. Broadcast delivery system 116 may provide video content 320 to switched delivery system 118, switched delivery system 118 may provide video content 320 to BHR 126, and BHR 126 may provide video content 320 to STB 124. STB 124 may provide video content 320 to television 130, and television 130 may display video content 320 (e.g., to a user).

Satellite dish 104 may receive video content 330 (e.g., via reception of satellite transmissions), and may provide video content 330 to CDN storage 110. In one example, video content 330 may include real time (RT) unicast video content, such as VOD content. CDN storage 110 may provide video content 330 to switched delivery system 118, switched delivery system 118 may provide video content 330 to BHR 126, and BHR 126 may provide video content 330 to STB 124. STB 124 may provide video content 330 to television 130, and television 130 may display video content 330 (e.g., to a user).

As further shown in FIG. 3, video content 340 may be provided to CDN storage 105 and/or to CDN storage 110 (e.g., from content providers, not shown). In one example, video content 340 may include best effort (BE) (or higher priority) unicast video content (e.g., OTT content 134), lower effort (LE) (or lower priority) multicast video content, and/or LE unicast video content. In one example implementation, video content 340 may include non-real time video content that is to be delivered during idle time periods of network 100. SSSM server 106 may instruct CDN 105 to provide video content 340 to CDN storage 110. SSSM server 112 may instruct CDN storage 110 to provide video content 340 to switch delivery system 118, CDN storage 120, and/or HMD 128. CDN storage 120 may provide video content 340 to switched delivery system 118. Switched delivery system 118 may provide video content 340 to BHR 126, and BHR 126 may provide video content 340 to STB 124 and/or user device 132 (e.g., for display to a user). STB 124 may provide video content 340 to television 130, and television 130 may display video content 330 (e.g., to a user). HMD 128 may store video content 340 for later retrieval by BHR 126. BHR 126 may retrieve video content 340 from HMD 128, and may provide video content 340 to STB 124. STB 124 may provide video content 340 to television 130, and television 130 may display video content 340 (e.g., to a user). HMD 128 may provide video content 340 to television 130 and/or user device 132 in real time and in a manner that provides security for video content 340.

As described above, network portion 300 may utilize under-the-bottom lower effort (LE) IP transport for non-real time video content 340, and may transmit non-real time video content 340 during idle time periods of network portion 300. During the idle time periods, network portion 300 may have significant capacity available for provision (or transmission) of non-real time video content 340. The non-real time video content 340 may be broadcast, in real time, at customer premise 122 (e.g., the next day). In one implementation, if network portion 300 detects network congestion (e.g., using a congestion notification), network portion 300 may reduce or cease provision (or transmission) of non-real time video content 340.

The under-the-bottom delivery of non-real time video content 340 may make better use of existing resources in network portion 300. In one example implementation, network portion 300 may charge for the amount of non-real time video content 340 that is transported (rather than how quickly it is transported), and may schedule delivery of non-real time video content 340 to maximize for off-peak network utilization and/or charges less for this (e.g., which may be important in lower bandwidth networks).

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
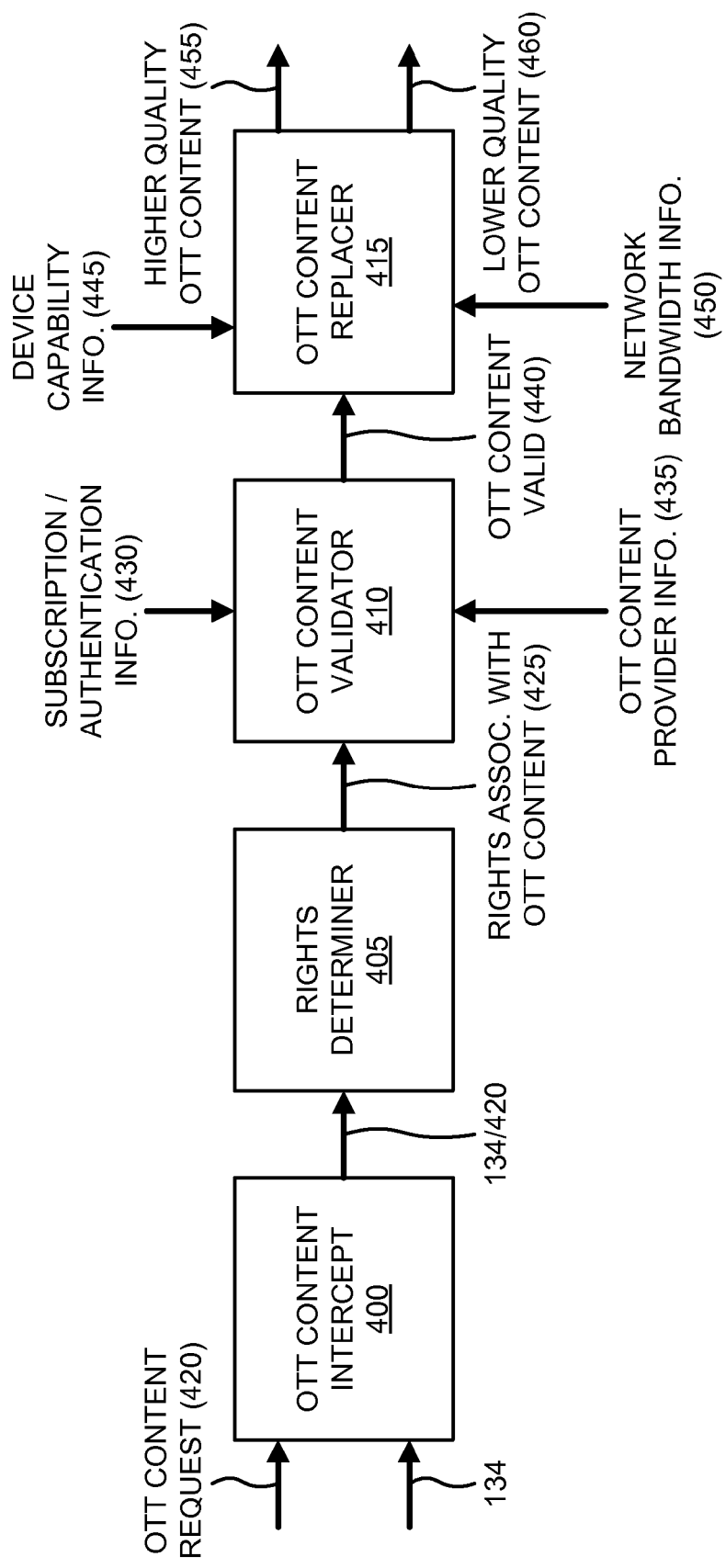
FIG. 4 is a diagram of example functional components of a subscription, search, and selection management (SSSM) server of the network depicted in FIG. 1.

FIG. 4 is a diagram of example functional components of a SSSM server (e.g., SSSM server 106 or SSSM server 112) of network 100. In one implementation, the functions described in connection with FIG. 4 may be performed by one or more components of device 200 (FIG. 2). As shown in FIG. 4, SSSM servers 106/112 may include an OTT content intercept component 400, a rights determiner 405, an OTT content validator 410, and an OTT content replacer 415.

OTT content intercept component 400 may include hardware or a combination of hardware and software that may intercept OTT video content 134 (e.g., provided to SHE 102 or VHO 108) or an OTT video content request 420 (e.g., provided to SHE 102 or VHO 108). OTT video content request 420 may include a request for OTT content (e.g., video content 340) that is generated by a customer premise device (e.g., STB 124, television 130, user device 132, etc.). In one example, OTT video content request 420 may be provided from a customer premise device to CDN storage 105/110. CDN storage 105/110 may provide OTT video content request 420 to SSSM server 106/112, and may consult SSSM server 106/112 at the beginning of a content transfer to determine if a better quality version of content is available, authorized, and a customer is willing to pay for it. This is an example of a policy type interaction between CDN storage 105/110 and SSSM server 106/112. In another example, OTT video content request 420 may include a request for a particular quality of OTT video content (e.g., higher quality OTT video content or lower quality OTT video content). SSSM server 106/112 may thus provide a controlled quality experience for OTT video content.

If OTT video content request 420 is received, OTT content intercept component 400 may also intercept the OTT video content requested by OTT video content request 420. For example, this may be a policy request (i.e., a pull operation) from CDN storage 105/110 to SSSM server 106/112 or some other method (e.g., sniffing all content requests). As further shown in FIG. 4, OTT content intercept component 400 may provide OTT video content 134 and/or request 420 to rights determiner component 405.

Rights determiner 405 may include hardware or a combination of hardware and software that may receive OTT video content 134 and/or request 420 from OTT content intercept component 400, and may determine rights associated with OTT video content 134 or the OTT video content requested by OTT video content request 420, as indicated by reference number 425. In one example implementation, OTT video content 134 may include copyright information (e.g., reproduction rights or download rights as set forth by the Digital Entertainment Content Ecosystem (DECE) consortium) that may be interpreted by rights determiner 405. As further shown in FIG. 4, rights determiner 405 may provide rights information 425 associated with OTT video content 134 to OTT content validator 410.

OTT content validator 410 may include hardware or a combination of hardware and software that may receive rights information 425 from rights determiner 405, and may receive subscription/authentication information 430 and/or OTT content provider information 435 (e.g., from one or more other components of network 100). Subscription/authentication information 430 may include subscription information (e.g., premium subscription, price paid, third party charging supported for identified content, etc.) of a customer associated with a customer premise device (e.g., STB 124, television 130, user device 132, etc.) requesting OTT video content 134; authentication information (e.g., a customer name, a customer profile, a login name, a password, a secured subscriber device ID, or other authentication mechanisms) associated with the customer; etc. OTT content provider information 435 may include information (e.g., a name, price charged for content, etc.) associated with a provider of OTT video content 134. OTT content validator 410 may validate OTT video content 134 based on rights information 425, subscription/authentication information 430 and/or OTT content provider information 435, and (e.g., if OTT video content 134 is valid) may provide an indication 440 that OTT video content 134 is valid to OTT content replacer 415.

OTT content replacer 415 may include hardware or a combination of hardware and software that may receive indication 440 from OTT content validator 410, and may receive device capability information 445 and/or network bandwidth information 450 (e.g., from one or more other components of network 100). Device capability information 445 may include a capability (e.g., capable of receiving high quality video content, lower quality video content, etc.) of the customer premise device requesting OTT video content 134. Network bandwidth information 450 may include bandwidth of a network (e.g., network 100) that is available for delivering OTT video content 134 to the customer premise device. OTT content replacer 415 may determine a quality of the OTT video content to provide to the customer premise device based on indication 440, device capability information 445, and/or network bandwidth information 450. OTT content replacer 415 may provide the OTT video content, with the determined quality, to the customer premise device. With CDN storage 105/110, OTT content replacer 415 may be implemented by redirecting a customer premise device request to a different device with different characteristics.

In one example implementation, OTT content replacer 415 may adaptively add differentials (e.g., a type of linearity distortion which affects color saturation in television broadcasting) to OTT video content 134 to create higher quality OTT video content 455 (e.g., higher quality than OTT video content 134, such as increasing from a 360i format to a 1080i format), and may replace OTT video content 134 with higher quality OTT video content 455. As shown in FIG. 4, OTT content replacer 415 may provide higher quality OTT video content 455 to the customer premise device (not shown). In one example, OTT content replacer 415 may monitor the quality added to OTT video content 134, and may utilize the increase in quality for charging the customer associated with the customer premise device.

In other implementations, OTT content replacer 415 may adaptively subtract differentials from OTT video content 134 to create lower quality OTT video content 460 (e.g., lower quality than OTT video content 134, such as decreasing from a 1080p format to a 480p format), and may replace OTT video content 134 with lower quality OTT video content 460. As shown in FIG. 4, OTT content replacer 415 may provide lower quality OTT video content 460 to the customer premise device (not shown). Alternatively, a version of higher and lower quality video content may be pre-computed and stored instead of doing transformations in response to each request. Such an approach may be more cost effective for popular content since storage is less expensive than processing.

Although FIG. 4 shows example functional components of SSSM servers 106/112, in other implementations, SSSM servers 106/112 may include fewer functional components, different functional components, differently arranged functional components, or additional functional components than depicted in FIG. 4. Alternatively, or additionally, one or more functional components of SSSM servers 106/112 may perform one or more other tasks described as being performed by one or more other functional components of SSSM servers 106/112.

Figure 5:
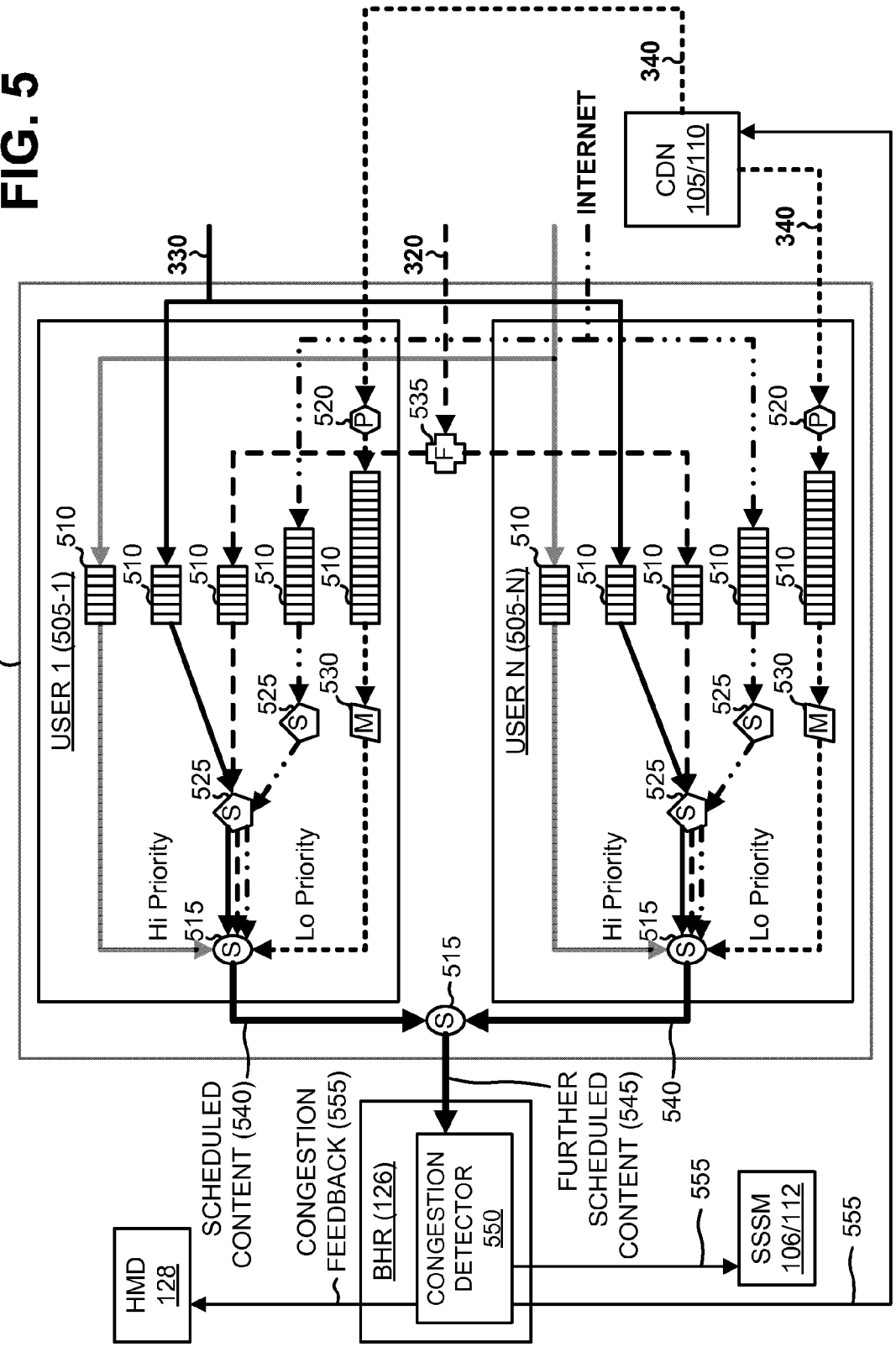
FIG. 5 is a diagram of example functional components of a switched delivery system of the network depicted in FIG. 1.

FIG. 5 is a diagram of example functional components of switched delivery system 118. In one implementation, the functions described in connection with FIG. 5 may be performed by one or more components of device 200 (FIG. 2). As shown in FIG. 5, switched delivery system 118 may include multiple user components 505-1, . . . , 505-N (collectively referred to herein as "user components 505," and singularly as "user component 505") that include admit queues 510, scheduling logic 515, policing logic 520, shaping logic 525, and marking logic 530; and may also include forwarding logic 535.

User component 505 may include hardware or a combination of hardware and software that may receive different types of content (e.g., video content, voice content, data, etc.), and may schedule the different types of content for delivery to a corresponding subscriber (e.g., to a customer premise associated with a subscriber). For example, as shown in FIG. 5, user components 505 may receive video content 320 (e.g., IPTV content), video content 330 (e.g., VOD content), non-real time video content 340 from CDN storage 105/110, voice content (e.g., VoIP content), Internet content (e.g., data), etc.

Admit queues 510 may include hardware or a combination of hardware and software that may receive and store the different types of content in a particular order. In one implementation, admit queues 510 may be used to prioritize the different types of content (e.g., low priority, high priority, etc.) so that the different types of content may be scheduled for delivery to a corresponding subscriber.

Scheduling logic 515 may include hardware or a combination of hardware and software that may receive the different types of content (e.g., as prioritized by admit queues 510), and may schedule the content for delivery to a corresponding subscriber.

Policing logic 520 may include hardware or a combination of hardware and software that may provide network security features (e.g., filtering, firewall capability, etc.) for the different types of content.

Shaping logic 525 may include hardware or a combination of hardware and software that may receive the different types of content and may apply traffic shaping to the content. For example, shaping logic 525 may apply traffic shaping to the content in order to optimize or guarantee performance of the content, improve latency, and/or increase usable bandwidth (e.g., by delaying content that meets certain criteria).

Marking logic 530 may include hardware or a combination of hardware and software that may apply traffic marking to the different types of content. Marking the different types of content may enable attributes for the content (e.g., belonging to a specific class or category) to be set or modified.

Forwarding logic 535 may include hardware or a combination of hardware and software that may receive a particular one of the different types of content, and may provide multicast replication for the particular content.

As further shown in FIG. 5, the voice content may be provided to first admit queues 510 (e.g., the first from the top), and the first admit queues 510 may forward the voice content to scheduling logic 515. Video content 330 (e.g., VOD content) may be provided to second admit queues 510 (e.g., the second from the top), and the second admit queues 510 may provide video content 330 to a first shaping logic 525. Video content 320 (e.g., IPTV content) may be provided to forwarding logic 535, and forwarding logic 535 may provide video content 320 to third admit queues 510 (e.g., the third from the top). The higher quality VOD and IPTV queues may be used by SSSM server 106/112 if SSSM server 106/112 is in the same policy control domain (e.g., the same service provider). Alternatively, if switched delivery system 118 is in another service provider domain (e.g., than SSSM server 106/112), then other mechanisms for enabling higher quality for a set of IP packets, such as a differentiated service (Diffserv) or resource reservation protocol (RSVP) could be used. The third admit queues 510 may provide video content 320 to the first shaping logic 525. The Internet content may be provided to fourth admit queues 510 (e.g., the fourth from the top), and the fourth admit queues 510 may provide the Internet content to a second shaping logic 535 (e.g., for traffic shaping). The second shaping logic 535 may provide the shaped Internet content to the first shaping logic 535. CDN storage 105/110 may provide video content 340 (e.g., non-real time video content) to policing logic 520 (e.g., for filtering), and policing logic 520 may provide the filtered video content 340 to fifth admit queues 510 (e.g., the fifth from the top). The fifth admit queues 510 may provide the filtered video content 340 to marking logic 530 (e.g., for traffic marking), and marking logic 530 may provide the filtered/marked video content 340 to scheduling logic 515.

The first shaping logic 525 may receive video content 320/330 and the Internet content, and may apply traffic shaping to video content 320/330 and the Internet content. The first shaping logic 525 may provide the shaped video content 320/330 and Internet content to scheduling logic 515. Each scheduling logic 515 (e.g., of user components 505) may receive video content 320-340, the voice content, and the Internet content, and may schedule the content for ultimate delivery to BHR 126, as indicated by reference number 540. Each scheduling logic 515 may provide scheduled content 540 to another scheduling logic 515 (e.g., of switched delivery system 118), and the other scheduling logic 515 may further schedule content 540 for delivery to BHR 126, as indicated by reference number 545. The other scheduling logic 515 may forward scheduled content 545 to BHR 126 (e.g., pursuant to a schedule determined by the other scheduling logic 515). BHR 126 may forward scheduled content 545 (e.g., pursuant to the schedule) to one or more devices provided at customer premise 122 (e.g., STB 124, HMD 128, user device 132, etc.). The net effect of the aforementioned queuing and scheduling logic may be to enable a bandwidth scavenger type of service (also called a lower effort service) that defers transmission in the event of any other traffic of higher priority.

As further shown in FIG. 5, BHR 126 may include a congestion detector 550 that may receive scheduled content 545 from the other scheduling logic 515, and may generate congestion feedback information 555 based on scheduled content 545. Congestion feedback information 555 may include information associated with usage (e.g., congested, low traffic, medium traffic, etc.) of network 100. Congestion detector 550 may provide congestion feedback information 555 to SSSM servers 106/112, CDN storage 105/110, and/or HMD 128. In one example implementation, congestion feedback information 555 may be used by SSSM servers 106/112, CDN storage 105/110, and/or HMD 128 to determine when, how much, etc. non-real time video content may be delivered in network 100.

In one implementation, SSSM servers 106/112 may receive congestion feedback information 555, may determine a quality of non-real time video content 340 to provide based on congestion feedback 555. In one example, if SSSM servers 106/112 detect network congestion (e.g., based on congestion feedback information 555), SSSM servers 106/112 may replace non-real time video content 340 with lower quality non-real time video content 340. In another example, if SSSM servers 106/112 do not detect network congestion (e.g., based on congestion feedback information 555), SSSM servers 106/112 may replace non-real time video content 340 with higher quality non-real time video content 340.

Congestion detector 550 may implement a variety of congestion control methods (e.g., to generate congestion feedback information 555), such as an explicit congestion notification (ECN) method, a pre-congestion notification (PCN) method, a re-inserted feedback ECN (re-ECN) method, a low extra delay background transport (ledbat) method, etc.

In the ECN method, the ECN may be negotiated between network endpoints (e.g., switched delivery system 118 and BHR 126), and an ECN-aware device may set an IP header bit in a packet (e.g., instead of dropping the packet) to signal the beginning of congestion in a network (e.g., network 100). A packet receiver may echo the congestion indication to a packet sender, and the packet sender may react as if the packet was dropped.

In the PCN method, PCN threshold rates may be configured on edge and backbone links in a trusted domain, and a network device (e.g., BHR 126) may compare actual packet rates to the PCN threshold rates, and may mark packets that exceed the PCN threshold rates. A destination network device (e.g., BHR 126) may return congestion feedback (e.g., congestion feedback information 555) to a source network device. The source network device may police traffic based on flow rate, may determine whether new PCN flows can be admitted, may terminate existing PCN flows (e.g., in case of extreme congestion), etc. The re-ECN method may function similar to the PCN method, but in a non-trusted domain rather than in a trusted domain. In the ledbat method, ECN measurements or application layer latency measurements may be used to provide congestion feedback to "bandwidth scavenger" applications.

Although FIG. 5 shows example functional components of switched delivery system 118, in other implementations, switched delivery system 118 may include fewer functional components, different functional components, differently arranged functional components, or additional functional components than depicted in FIG. 5. Alternatively, or additionally, one or more functional components of switched delivery system 118 may perform one or more other tasks described as being performed by one or more other functional components of switched delivery system 118.

Figure 6:
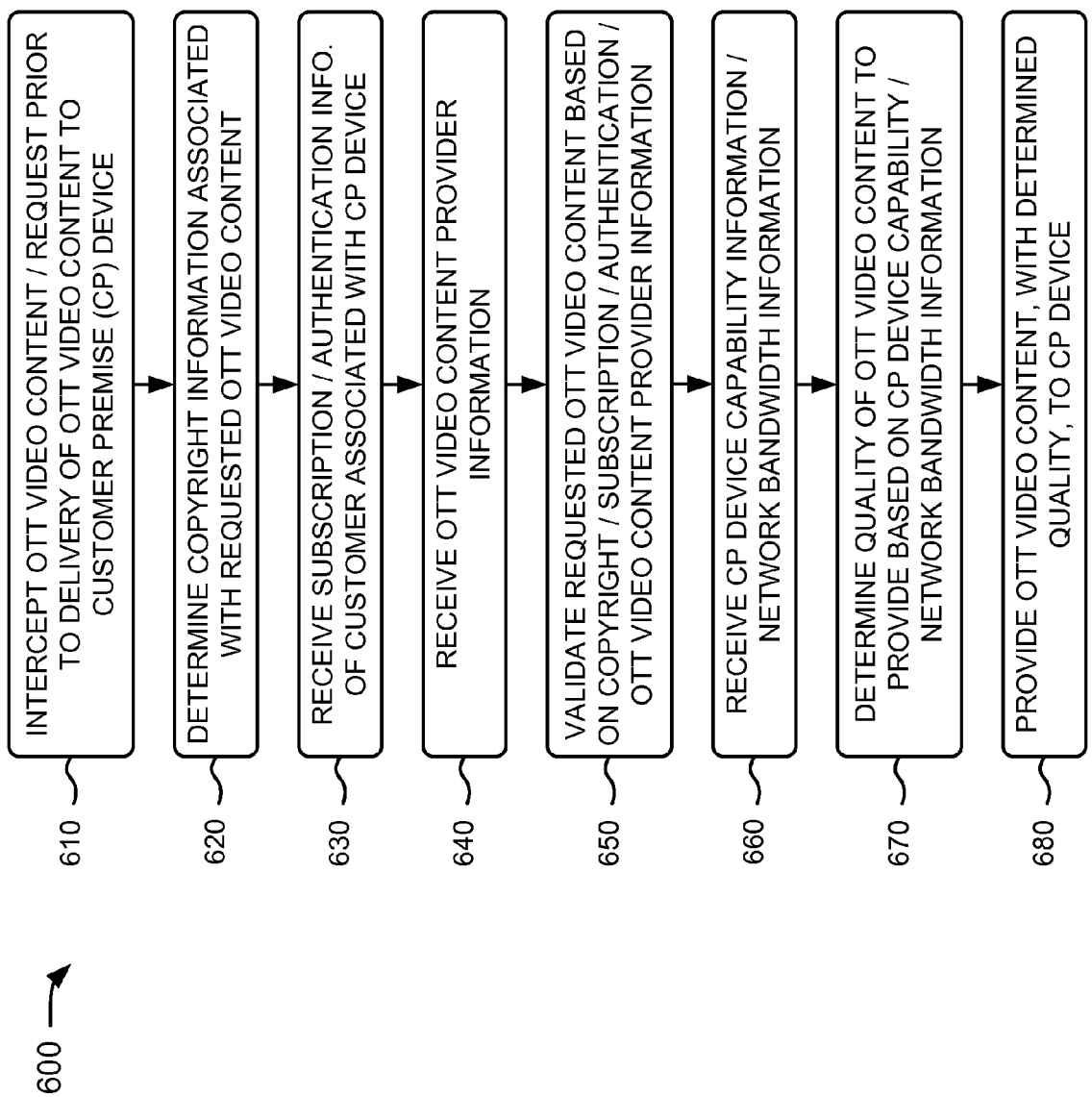
Figure 7:
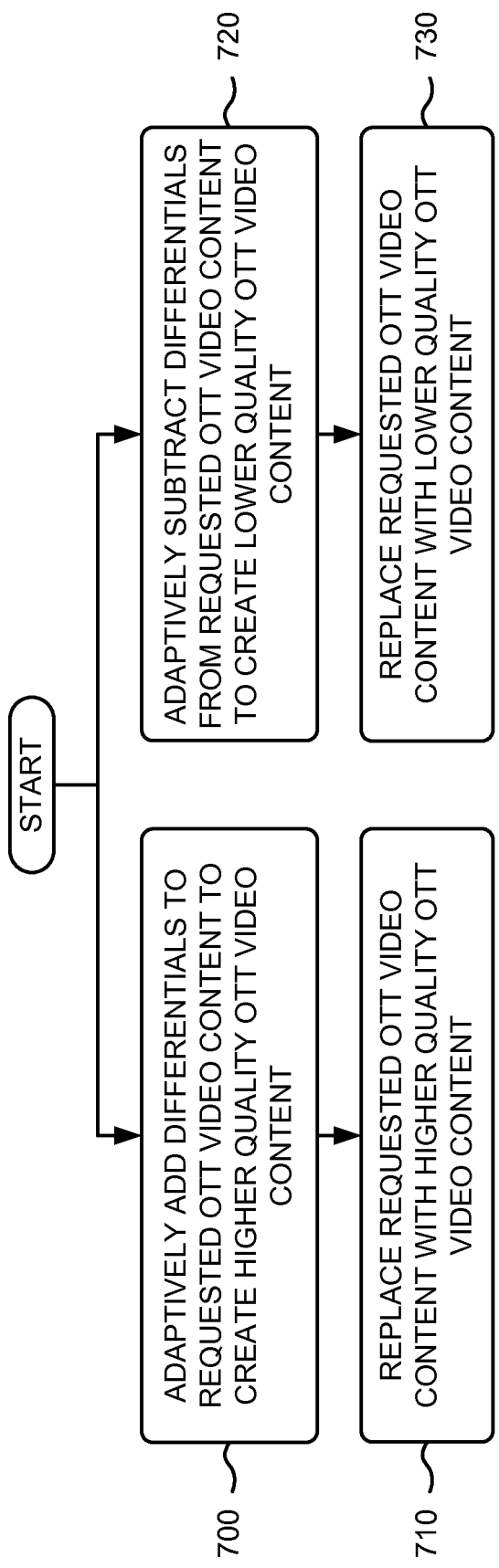

FIGS. 6-8 are flow charts of an example process 600 for providing adaptive video quality substitution according to implementations described herein. In one implementation, process 600 may be performed by SSSM server 106 and/or SSSM server 112. In another implementation, some or all of process 600 may be performed by another device or group of devices, including or excluding SSSM server 106 and/or SSSM server 112.

As illustrated in FIG. 6, process 600 may include intercepting OTT video content or a request (for OTT video content) prior to delivery of the OTT video content to a customer premise device of a network (block 610), and determining copyright information associated with the requested OTT video content (block 620). For example, in implementations described above in connection with FIG. 4, OTT content intercept component 400 of SSSM servers 106/112 may intercept OTT video content 134 (e.g., provided to SHE 102 or VHO 108) or OTT video content request 420 (e.g., provided to SHE 102 or VHO 108). If OTT video content request 420 is received, OTT content intercept component 400 may also intercept the OTT video content requested by OTT video content request 420. Rights determiner 405 of SSSM servers 106/112 may receive OTT video content 134 and/or request 420 from OTT content intercept component 400, and may determine rights associated with OTT video content 134 or the OTT video content requested by OTT video content request 420, as indicated by reference number 425. In one example implementation, OTT video content 134 may include copyright information (e.g., reproduction rights or download rights as set forth by the DECE consortium) that may be interpreted by rights determiner 405.

As further shown in FIG. 6, process 600 may include receiving subscription and/or authentication information of a customer associated with the customer premise device (block 630), receiving OTT video content provider information (block 640), and validating the requested OTT video content based on the copyright information, the subscription/authentication information, and/or the OTT video content provider information (block 650). For example, in implementations described above in connection with FIG. 4, OTT content validator 410 of SSSM servers 106/112 may receive rights information 425 from rights determiner 405, and may receive subscription/authentication information 430 and/or OTT content provider information 435 (e.g., from one or more other components of network 100). Subscription/authentication information 430 may include subscription information of a customer associated with a customer premise device requesting OTT video content 134, authentication information associated with the customer, etc. OTT content provider information 435 may include information (e.g., a name, price charged for content, etc.) associated with a provider of OTT video content 134. OTT content validator 410 may validate OTT video content 134 based on rights information 425, subscription/authentication information 430 and/or OTT content provider information 435, and (e.g., if OTT video content 134 is valid) may provide an indication 440 that OTT video content 134 is valid to OTT content replacer 415, which may be implemented by SSSM server 106/112 controlling CDN storage 105/110.

Returning to FIG. 6, process 600 may include receiving customer premise device capability information and network bandwidth information (block 660), determining a quality of OTT video content to provide based on the customer premise device capability information and/or the network bandwidth information (block 670), and providing OTT video content, with the determined quality, to the customer premise device (block 680). For example, in implementations described above in connection with FIG. 4, OTT content replacer 415 of SSSM servers 106/112 may receive indication 440 from OTT content validator 410, and may receive device capability information 445 and/or network bandwidth information 450. Device capability information 445 may include a capability (e.g., capable of receiving high quality video content, lower quality video content, etc.) of the customer premise device requesting OTT video content 134. Network bandwidth information 450 may include bandwidth of a network (e.g., network 100) that is available for delivering OTT video content 134 to the customer premise device. OTT content replacer 415 may determine a quality of the OTT video content to provide to the customer premise device based on indication 440, device capability information 445, and/or network bandwidth information 450. OTT content replacer 415 may provide the OTT video content, with the determined quality, to the customer premise device.

Process block 670 may include the process blocks depicted in FIG. 7. As shown in FIG. 7, process block 670 may include adaptively adding differentials to the requested OTT video content to create higher quality OTT video content (block 700), and replacing the requested OTT video content with the higher quality OTT video content (block 710). For example, in implementations described above in connection with FIG. 4, OTT content replacer 415 may adaptively add differentials to OTT video content 134 to create higher quality OTT video content 455 (e.g., higher quality than OTT video content 134, such as increasing from a 360i format to a 1080i format), and may replace OTT video content 134 with higher quality OTT video content 455. Alternatively, instead of dynamically modifying OTT video content 134, a pre-computed and stored version of higher quality OTT video content 455 may be retrieved.

Alternatively, process block 670 may include adaptively subtracting differentials from the requested OTT video content to create lower quality OTT video content (block 720), and replacing the requested OTT video content with the lower quality OTT video content (block 730). For example, in implementations described above in connection with FIG. 4, OTT content replacer 415 may adaptively subtract differentials from OTT video content 134 to create lower quality OTT video content 460 (e.g., lower quality than OTT video content 134, such as decreasing from a 1080p format to a 480p format), and may replace OTT video content 134 with lower quality OTT video content 460. Alternatively, instead of dynamically modifying OTT video content 134, a pre-computed and stored version of lower quality OTT video content 460 may be retrieved.

Process block 680 may include the process blocks depicted in FIG. 8. As shown in FIG. 8, process block 680 may include providing, to the customer premise device, higher quality OTT video content than the requested OTT video content (block 800), and utilizing the increase in quality of the OTT video content for charging the customer (block 810). Alternatively, process block 680 may include providing, to the customer premise device, lower quality OTT video content than the requested OTT video content (block 820). For example, in implementations described above in connection with FIG. 4, OTT content replacer 415 may provide higher quality OTT video content 455 to the customer premise device. In one example, OTT content replacer 415 may monitor the quality added to OTT video content 134, and may utilize the increase in quality for charging the customer associated with the customer premise device. Alternatively, OTT content replacer 415 may provide lower quality OTT video content 460 to the customer premise device.

Systems and/or methods described herein may provide adaptive video quality substitution for video content. The adaptive video quality substitution may match a quality of the delivered video content to the capabilities of a device receiving the video content and/or based on network bandwidth available for delivering the video content. In one example, the systems and/or methods may apply adaptive video quality substitution to OTT video content. In other examples, the systems and/or methods may apply adaptive video quality substitution to video content other than OTT video content.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel. .

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device in a network that delivers video content, the method comprising:
   intercepting, by the computing device, requested video content prior to delivery of the requested video content to a customer premise device of the network;
   receiving, by the computing device, subscription and authentication information of a customer associated with the customer premise device;
   receiving, by the computing device, video content provider information;
   validating, by the computing device, the requested video content based on the subscription and authentication information and based on the video content provider information;
   receiving, by the computing device, capability information associated with the customer premise device;
   receiving, by the computing device, bandwidth information associated with the network;
   determining, by the computing device, whether to dynamically adjust a quality of video content to provide to the customer premise device, based on the customer premise device capability information and based on the network bandwidth information,
      wherein, in response to determining to dynamically adjust the quality of the video content, the quality of the video content is dynamically adjusted based on differentials that correspond to a particular quality, and
      wherein the differentials used to produce the dynamically adjusted quality of the video content further correspond to a higher or a lower video content quality; and
   providing, by the computing device and to the customer premise device, the video content with the dynamically adjusted quality.

2. The method of claim 1, where the computing device is provided in one or more of:
   a super head end (SHE) of the network, or
   a video hub office (VHO) of the network.

3. The method of claim 1, further comprising:
   determining copyright information associated with the requested video content; and
   validating the requested video content based on one or more of:
   the copyright information,
   the subscription and authentication information, or
   the video content provider information.

4. The method of claim 3, where the copyright information includes reproduction rights, as set forth by the Digital Entertainment Content Ecosystem (DECE) consortium, associated with the requested video content.

5. The method of claim 1, where the video content includes over the top (OTT) video content.

6. The method of claim 1, where the subscription and authentication information includes one or more of:
   a subscription of the customer for video content, or
   information used to authenticate the customer for receipt of the requested video content.

7. The method of claim 1, where the video content provider information includes a price charged for the requested video content by a provider of the requested video content.

8. The method of claim 1, where the customer premise device capability information includes a level of quality of video content capable of being received by the customer premise device.

9. The method of claim 1, where the network bandwidth information includes bandwidth of the network that is available for delivering the requested video content to the customer premise device.

10. The method of claim 1, wherein determining whether to dynamically adjust the quality of video content includes:
    adding differentials to the requested video content to create higher quality video content than the requested video content; and
    replacing the requested video content with the higher quality video content.

11. The method of claim 1, wherein determining whether to dynamically adjust the quality of video content includes:
    subtracting differentials from the requested video content to create lower quality video content than the requested video content; and
    replacing the requested video content with the lower quality video content.

12. The method of claim 1, where providing video content with the determined quality includes:
    providing, to the customer premise device, higher quality video content than the requested video content; and
    utilizing the increase in quality of the requested video content for charging the customer.

13. The method of claim 1, where providing video content with the determined quality includes:
    providing, to the customer premise device, lower quality video content than the requested video content.

14. A computing device provided in a network that delivers video content, where the computing device comprises:
    a memory to store a plurality of instructions; and
    a processor to execute instructions in the memory to:
       intercept requested over the top (OTT) video content prior to delivery of the requested OTT video content to a customer premise device of the network,
       receive subscription and authentication information of a customer associated with the customer premise device,
       receive OTT video content provider information,
       validate the requested OTT video content based on the subscription and authentication information and based on the OTT video content provider information,
       receive capability information associated with the customer premise device,
       receive bandwidth information associated with the network,
       determine a quality of OTT video content or an adjusted quality of the OTT video content, to provide to the customer premise device, based on the customer premise device capability information and based on the network bandwidth information,
       wherein the adjusted quality corresponds to an increase or a decrease of video content quality that is based on differentials that correspond to a particular quality of OTT video content, and
       provide, to the customer premise device, OTT video content with the determined quality or the adjusted quality.

15. The computing device of claim 14, where the computing device is provided in one or more of:
    a super head end (SHE) of the network, or
    a video hub office (VHO) of the network.

16. The computing device of claim 14, where the processor is further to execute instructions in the memory to:
    determine copyright information associated with the requested OTT video content, and
    validate the requested OTT video content based on one or more of:
    the copyright information,
    the subscription and authentication information, or
    the OTT video content provider information.

17. The computing device of claim 16, where the copyright information includes reproduction rights, as set forth by the Digital Entertainment Content Ecosystem (DECE) consortium, associated with the requested OTT video content.

18. The computing device of claim 14, where the subscription and authentication information includes one or more of:
    a subscription of the customer for OTT video content, or
    information used to authenticate the customer for receipt of the requested OTT video content.

19. The computing device of claim 14, where the OTT video content provider information includes a price charged for the requested OTT video content by a provider of the requested OTT video content.

20. The computing device of claim 14, where the customer premise device capability information includes a level of quality of OTT video content capable of being received by the customer premise device.

21. The computing device of claim 14, where the network bandwidth information includes bandwidth of the network that is available for delivering the requested OTT video content to the customer premise device.

22. The computing device of claim 14, where, when determining a quality of OTT video content, the processor is further to execute instructions in the memory to:
    add differentials to the requested OTT video content to create higher quality OTT video content than the requested OTT video content, and
    replace the requested OTT video content with the higher quality OTT video content.

23. The computing device of claim 14, where, when determining a quality of OTT video content, the processor is further to execute instructions in the memory to:
    subtract differentials from the requested OTT video content to create lower quality OTT video content than the requested OTT video content, and replace the requested OTT video content with the lower quality OTT video content.

24. The computing device of claim 14, where, when providing OTT video content with the determined quality, the processor is further to execute instructions in the memory to one of:
provide, to the customer premise device, higher quality OTT video content than the requested OTT video content, or
provide, to the customer premise device, lower quality OTT video content than the requested OTT video content.

25. A system, comprising:
a non-transitory storage device for storing data; and
one or more devices, wherein at least one of the one or more devices includes a processor configured to:
intercept requested video content prior to delivery of the requested video content to a customer premise device of a network,
receive subscription and authentication information of a customer associated with the customer premise device,
receive video content provider information,
determine copyright information associated with the requested video content,
validate the requested video content based on one or more of the copyright information, the subscription and authentication information, or the video content provider information,
receive capability information associated with the customer premise device,
receive bandwidth information associated with the network,
determine whether a quality of video content is to be adjusted, to provide to the customer premise device, based on:
the customer premise device capability information,
the network bandwidth information, and
differentials that correspond to a particular quality, and
provide, to the customer premise device, video content with the determined quality.

* * * * *